United States Patent
Andrews et al.

(10) Patent No.: US 7,313,304 B2
(45) Date of Patent: Dec. 25, 2007

(54) LOCATABLE DIELECTRIC OPTICAL FIBER CABLE HAVING EASILY REMOVABLE LOCATING ELEMENT

(75) Inventors: Robert J. Andrews, Apex, NC (US); Scott M. Chastain, Holly Springs, NC (US); Stephen R. Stokes, Raleigh, NC (US); George A. Mackie, Leominster, MA (US)

(73) Assignee: Sumitomo Electric Lightwave Corp., Research Triangle Park, NC (US)

( * ) Notice: Subject to any disclaimer, the term of this patent is extended or adjusted under 35 U.S.C. 154(b) by 0 days.

(21) Appl. No.: 10/914,762

(22) Filed: Aug. 9, 2004

(65) Prior Publication Data

US 2006/0029340 A1 Feb. 9, 2006

(51) Int. Cl.
*G02B 6/44* (2006.01)
(52) U.S. Cl. .................. 385/107; 385/103; 385/113
(58) Field of Classification Search ............... 385/101, 385/103, 107, 113
See application file for complete search history.

(56) References Cited

U.S. PATENT DOCUMENTS

| | | | |
|---|---|---|---|
| 5,006,806 A | 4/1991 | Rippingale et al. | |
| 5,017,873 A | 5/1991 | Rippingale et al. | |
| 5,189,718 A | 2/1993 | Barrett et al. | |
| 5,305,410 A | 4/1994 | Arroyo | |
| 5,305,411 A | 4/1994 | Arroyo | |
| 5,577,147 A | 11/1996 | Arroyo et al. | |
| 6,363,192 B1 * | 3/2002 | Spooner | 385/101 |
| 6,501,888 B2 | 12/2002 | Gimblet et al. | |
| 6,542,674 B1 | 4/2003 | Gimblet | |
| 6,714,710 B2 | 3/2004 | Gimblet | |
| 7,113,679 B2 | 9/2006 | Melton et al. | |

* cited by examiner

*Primary Examiner*—Michelle Connelly-Cushwa
*Assistant Examiner*—Jerry T Rahll
(74) *Attorney, Agent, or Firm*—Jenkins, Wilson, Taylor & Hunt, P.A.

(57) ABSTRACT

The present invention provides a dielectric optical fiber cable which is capable of being remotely detected while buried. Specifically, this invention incorporates a detectable and easily removable locating element which is attached to the optical fiber cable by a web defined by the jacket extending over both the optical fiber cable and the locating element. The web allows for the locating strand to be easily removed once separation of the locating element from the optical fiber cable is initiated. The web is designed to allow the initial tear to propagate into a precise longitudinal tear along a predetermined length of the optical fiber cable.

32 Claims, 2 Drawing Sheets

LOCATABLE DIELECTRIC OPTICAL FIBER CABLE HAVING EASILY REMOVABLE LOCATING ELEMENT

TECHNICAL FIELD

This invention relates to a locatable optical fiber cable. More particularly, the optical fiber cable of the invention has an easily removable locating element which is engineered to allow for propagation on a precise longitudinal tear once separation of the locating element from the optical fiber cable is initiated.

RELATED ART

Prior art consists of fiber cable designs that incorporate locating elements within the cable structure. The locating elements are typically conductive elements such as copper wires, steel or aluminum shields applied to the cable sheath, or metallic strength elements. Any conductive elements incorporated into the cable structure must be grounded at the terminal ends of the cable for safety reasons. Conductive elements are prone to carry induced currents, which are potentially lethal, due to proximity to power lines above and below ground. Conductive elements are also prone to damage from lightning strikes to ground. Prior art cable is located underground by use of common location equipment. The location equipment will induce a signal into the conductor(s), typically at one end of the cable. The signal can be induced through direct connection to the conductor(s) or through induction by an electro-magnetic field. A sensor, selectively tuned to pick up the transmitted signal, then detects the location of the cable. Under these circumstances, the conductor is essentially acting as a transmission antenna.

An alternative method to that described above is to co-locate a separate conductive element with the dielectric fiber optic cable. In a direct-buried cable application, the conductive element can be in the form of an insulated electrical wire that is placed into a trench before, during, or after the fiber optic cable is placed into the trench (typically during). In an underground duct cable application, another form of this location method is to use a cable duct containing pre-installed pull-tape(s) which incorporates a conductive wire for locating purposes.

There is prior art pertinent to the invention disclosed herein. For example, U.S. Pat. No. 5,189,718 discloses a composite cable containing optical fibers and electrical conductors. The plurality of electrical conductors provides a means of transmitting data signals, electrical power, and/or providing locatability. This cable provides for a separation of the optical cable and the electrical cable into distinct units that are attached by a plastic web in a figure-8 style. The cable containing electrical conductors is essentially a communications cable, which requires at least two conductors for signal transmission or power transmission. Locatability is an incidental benefit of the conductors contained within the cable. While the two cables may be separated, separation would typically only be done in order to terminate the two cables at different locations or enclosures.

Additional prior art exists which incorporates non-conductive locating materials into the dielectric cable structure. The non-conductive material is magnetic and may be located using a magnetic location device. As disclosed in U.S. Pat. No. 5,006,806, U.S. Pat. No. 5,017,873, U.S. Pat. No. 5,305,410, U.S. Pat. No. 5,305,411, and U.S. Pat. No. 5,577,147, the magnetic material is incorporated into various elements or structures of the dielectric cable construction. The challenges with magnetically locatable cables continue to be: (1) lack of reliable locating equipment; (2) the ability to accurately locate the cable is prone to errors depending on soil type, soil conditions, and soil content (i.e. density, content of iron bearing particles or rocks, etc.); and (3) cable proximity to other cables, particularly cables which induce magnetic fields such as power cables.

Thus, there continues to be a long-felt need in the fiber optic cable industry for a cable design utilizing a locating element that is located external to the fiber optic cable, and which is easily removable without special tools. Such a cable has been invented and is described hereinbelow.

SUMMARY OF THE INVENTION

The present invention provides an optical fiber cable having a locating element which is easily removable without special tools and which provides for remote detection of the optical fiber cable while buried. The optical fiber cable comprises a core including at least one communications cable having a least one optical fiber transmission medium. A tubular member is disposed around the core, and a jacket system is disposed about the tubular member. A longitudinally extending detectable element which does not function as a communications cable is provided and is detachably connected to the tubular member by the jacket system disposed about the detectable element and the tubular member so as to define a web between the tubular member and the detectable element. The web between the tubular member and the detectable element defined by the jacket system thereover includes a notch between the tubular member and the detectable element which serves as shear plane to facilitate the propagation of a tear once initiated between the tubular member and the detectable element. The web has a thickness of about 2.0 millimeters or less. The detectable element is electrically conductive to be compatible with electrical signal based locating equipment. A metallic detectable element may also be compatible with magnetic locating equipment depending on cable depth, soil conditions, and proximity to other metallic or magnetic structures.

Therefore it is an object of the present invention to provide a dielectric optical fiber cable with a removable locating element.

It is another object of the present invention to provide a dielectric optical fiber cable having an easily removable and detectable locating element.

It is another object of the present invention to provide a dielectric optical fiber cable having a detectable locating element associated therewith which is designed so as to be easily detachable torn along the length of the optical fiber cable.

It is still another object of the present invention to provide a dielectric optical fiber cable having a detectable locating element which is designed so that when separation of the locator element from the optical fiber cable is initiated a precise longitudinal tear will be propagated along the length of the optical fiber cable while maintaining adequate jacket material coverage for both the optical fiber cable and the detectable locating element.

Some of the objects of the invention having been set forth hereinabove, other objects and features of the present invention will be more readily understood from the following detailed description of specific embodiments thereof when read in conjunction with the accompanying drawings, in which:

DETAILED DESCRIPTION OF THE INVENTION

As is well known to those skilled in the art, although optical fiber cables represent a large portion of the outside plant network, subscriber access distribution and drop cables are dominantly copper-based products, either twisted pair or co-axial designs. It is a common practice today to determine the location of buried cables using electrical properties inherent to metals such as copper. Since optical fiber cables do not have copper and can be totally dielectric, metallic elements may be incorporated into the cables to facilitate locating the cables. However, any metallic element that enters an enclosure or premise must be grounded for safety reasons. Grounding requires additional installation time and hardware. An innovative solution is required to make an optical fiber drop cable locatable while eliminating the need for grounding of the optical fiber cable.

Figure 1:
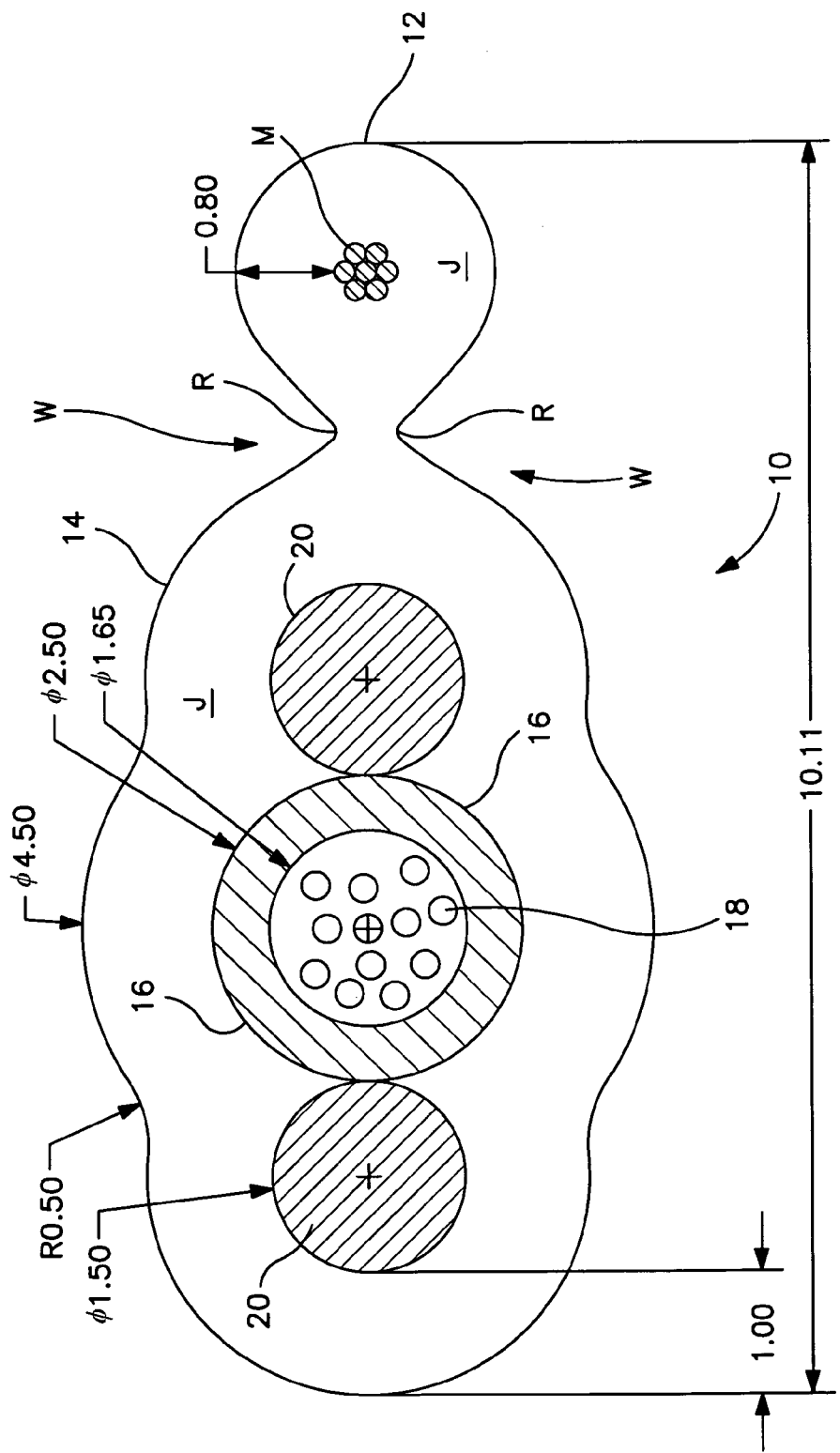
FIG. 1 is a vertical cross-sectional view of a dielectric optical fiber cable with removable locating element designed in accordance with the present invention.
Figure 2:
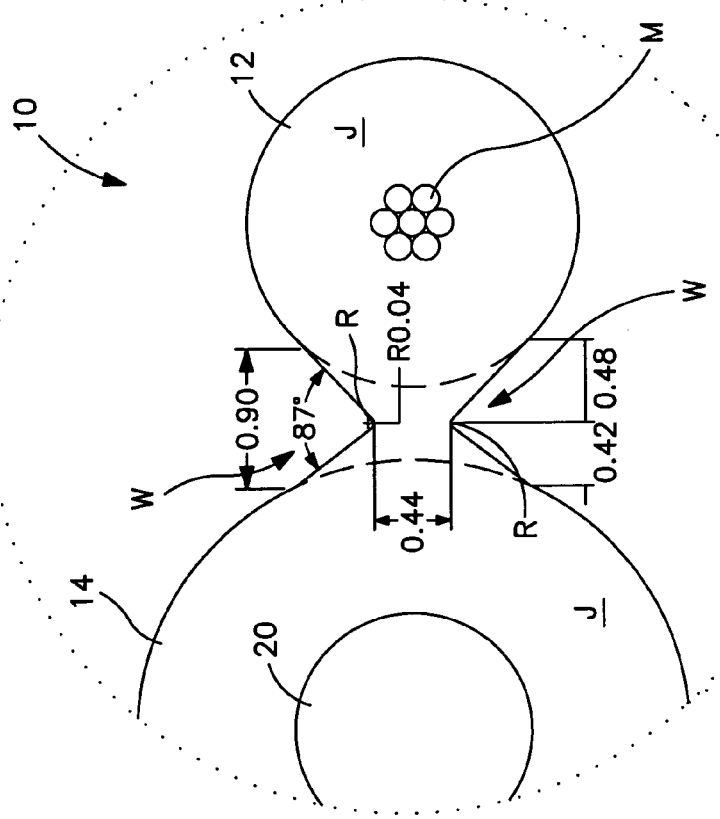
FIG. 2 is a vertical cross-sectional view of the cable of FIG. 1 with an enlarged view of the web between the optical fiber cable and the locating element.

Referring now to FIGS. 1 and 2 of the drawings, the cable design of the present invention consists of two distinct elements, a dielectric optical fiber cable and a removable external locating element. The locatable cable design of the invention is illustrated in FIG. 1 and generally designated 10. Dielectric cables are not unique, but the unique feature of cable 10 is the configuration of the locating element 12. Because element 12 is external and typically attached by a thin web W of extruded plastic to the optical fiber cable 14, it can be easily removed. Once separation is initiated, the attachment point is engineered to propagate a precise longitudinal tear along the length of cable 10. The design of cable 10 allows for the locating element to be removed while maintaining adequate jacket material J on both the optical fiber cable 14 and the locating element 12. Locating element 12 is provided for the sole purpose of determining the location of cable 10 after placement underground. It is important to be able to accurately locate the underground position of cable 10 to avoid damaging cable 10 during future excavations that could result in service outages, but to avoid the necessity to ground cable 10.

The benefits of an easily removable locating element 12 are two-fold. First, locating element 12 may be left attached over the majority of underground cable 10 to provide locatability. Locating element 12 may be separated from optical fiber cable 14 at either or both ends and cut back so that it does not need to be grounded in an enclosure or terminal. For example, a typical installation for a premise drop cable would include routing this cable from a distribution enclosure to a home, apartment, or business. Locating element 12 would be grounded at the enclosure, but it may be cut away from fiber optic cable 14 prior to entering the premise. In this application, locating element 12 does not require grounding at the premise end and thus results in saving the cost of labor and hardware for each home or business installation.

A second benefit of easily removable locating element 12 is that the strand may be removed from the entire cable length during installation so as to leave dielectric cable 14 for applications that do not require a locatable cable. This could eliminate the need for a user to maintain separate inventories of multiple cable designs.

More specifically, the present invention comprises a locatable optical fiber cable 10 comprising a fiber optic cable 14 with an externally mounted locating element 12. Locatable optical fiber cable 10 comprising optical fiber cable 14 and locating element 12 are joined together by overlying jacket J. Overlying jacket J defines a web between locating element 12 and optical fiber cable 14 which is designed to provide for propagation of a controlled tear once the tear is initiated at an end or along the length of locatable optical fiber cable 10.

Locating element 12 may comprise a metallic element M, and more specifically may be a stranded or solid wire. It has been discovered that stranded wire provides greater flexibility and reduced bend memory while solid wire offers greater longevity in use. Optimally, metallic element M of locatable optical fiber cable 10 is a 22 AWG or 24 AWG copper wire which is coated with insulating plastic jacket J that is co-extruded with the jacket J over fiber optic cable 14.

Jacket J that covers fiber optic cable 14 and locating element 12 may be outside plant polyethylene compounds such as MDPE (Medium Density Polyethylene) or HDPE (High Density Polyethylene) or a flame retardant compound such as PVC (Poly Vinyl Chloride) or FRPE (Flame Retardant Polyethylene) or other compound suitable for wire and cable insulation. Flame retardant compounds may be used for jacket J when locatable cable 10 is expected to attach to a customer premise where local, state, or national safety codes require a flammability rating.

Fiber optic cable 14 most suitably contains a core of one or more buffer tubes 16 which each contain one or more optical fibers 18. Fiber optic cable 14 of locatable cable 10 may be a stranded loose tube design containing individual optical fibers or a single central tube design containing individual fibers, fiber bundles, or optical fiber ribbons.

As a matter of design choice, fiber optic cable 14 may contain one or more dielectric strength elements 20 which may be flexible or rigid or any combination thereof. Dielectric strength elements are most suitably fiber reinforced plastic (FRP) although other materials may be used for dielectric strength members 20. Also, fiber optic cable 14 may contain a means of preventing water ingress along the cable length such as a water-blocking compound within buffer tube 16 and a water-blocking compound between buffer tube 16, strength elements 20 and jacket J. The water-blocking compound (not shown) may be gel or oil based or it may be based on dry, super-absorbent polymer technology.

Referring again to FIGS. 1 and 2 of the drawings, it will be appreciated that a preferred embodiment of locatable fiber optic cable 10 comprises a single buffer tube 16 containing one to twelve optical fibers 18. A dielectric fiber reinforced strength rod 20 is provided adjacent each side of buffer tube 16. A flame retardant PVC jacket J is co-extruded so as to cover buffer tube 16, strength elements 20, and metallic element M in locator element 12. Most suitably, metallic element M in locator element 12 is a stranded 24 AWG copper wire insulated with the same flame retardant PVC jacket as provided over optical fiber cable 14. The PVC jacket J is simultaneously extruded on both locator element 12 and fiber optic cable 14. Locator element 12 and fiber optic cable 14 are joined by a small web W of the same jacket plastic so as to define a figure-8 design. Jacket J characteristics as well as the shape and dimensions of web W are critical for obtaining a controlled tear between locator element 12 and fiber optic cable 14 once the tear is initiated.

Web W is shown in greater detail in FIG. 2. Web W defines a distinct tapered notch on the top and bottom thereof which provides a preferential shear plane to facilitate a clean tear along the length of cable 10 when locater element 12 is separated from optical fiber cable 14. While the thickness of web W is less than 0.5 mm and preferably 0.44 mm in cable 10 shown in FIGS. 1 and 2, it is contemplated that the invention provides for webs W that may be as thick as 2.0 mm for larger cables and/or lower modulus jacket materials. The jacket material properties determine the overall dimensions (i.e. thickness of web W). Significantly, it is the presence of the small radius R defined by each tapered notch of web W that facilitates the longitudinal shear plane. Tougher jacket materials require a sharper 'point' and smaller radius R for each tapered notch of web W.

Representative and preferred dimensions of cable 10 and web W of cable 10 shown in FIGS. 1 and 2 are as follows:

| | |
|---|---|
| Cable Width | 10.1 mm |
| Cable Height | 4.5 mm |
| Web Height | 0.44 mm |
| Typical Web Height | <1.0 mm |
| Typical Web Notch Radius | <1.0 mm |
| Preferred Web Notch Radius | <0.20 mm |

Although the preferred embodiment of cable 10 has been described with specificity above, it is further contemplated that locating element 12 could be attached to fiber optic cable 14 by other mechanical means such as clamps, tie-wraps or adhesive so long as locator element 12 is easily removable without damaging outer insulated jacket J on either locating element 12 or fiber optic cable 14.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. An optical fiber cable having an easily removable locating element, which includes:
   (a) a core including at least one optical fiber transmission medium;
   (b) a tubular member in which is disposed said core;
   (c) a jacket system which is disposed about said tubular member;
   (d) a longitudinally extending detectable element which does not function as a communications cable and which is detachably connected to said tubular member by said jacket system which is disposed about said detectable element so as to define a web between said tubular member and said detectable element;
   (e) wherein said web defines a notch between said tubular member and said detectable element which serves as a shear plane to facilitate the propagation of a tear between said tubular member and said detectable element, said web having a thickness of about 2.0 mm or less; and
   (f) wherein said optical fiber cable comprises a water-blocking compound in said tubular member and between said tubular member and said jacket system.

2. The optical fiber cable of claim 1 wherein said core comprises a plurality of communication fibers.

3. The optical fiber cable of claim 1 wherein said tubular member comprises a buffer tube.

4. The optical fiber cable of claim 3 wherein said buffer tube includes a plurality of optical fibers.

5. The optical fiber cable of claim 1 wherein said tubular member is made of plastic material.

6. The optical fiber cable of claim 1 wherein said jacket system comprises a material selected from the group comprising low density polyethylene (LDPE), linear low density polyethylene (LLDPE), medium density polyethylene (MDPE), high density polyethylene (HDPE), flame retardant polyvinyl chloride (PVC), and flame retardant polyethylene (FRPE), and said jacket system is co-extruded over said tubular member and said detectable element.

7. The optical fiber cable of claim 6 wherein said jacket system comprises flame retardant polyvinyl chloride (PVC).

8. The optical fiber cable of claim 1 wherein said detectable element is a metallic element.

9. The optical fiber cable of claim 8 wherein said metallic element may be a stranded or solid wire.

10. The optical fiber cable of claim 9 wherein said metallic element is a 24 AWG copper wire.

11. The optical fiber cable of claim 1 wherein said web has a thickness of less than 0.5 mm.

12. The optical fiber cable of claim 11 wherein said web has a thickness of 0.44 mm.

13. The optical fiber cable of claim 1 wherein a notch is both defined on the top and bottom of said web and each notch defines a radius.

14. The optical fiber cable of claim 13 wherein said radius is less than 1.0 mm and preferably less than 0.20 mm.

15. The optical fiber cable of claim 1 wherein said optical fiber cable includes one or more dielectric longitudinally extending strength members adjacent said tubular member.

16. The optical fiber cable of claim 15 wherein said optical fiber cable includes two dielectric fiber reinforced plastic (FRP) strength members.

17. The optical fiber cable of claim 1 wherein said optical fiber cable core and said tubular member thereover are selected from the group consisting of one or more buffer tubes including one or more optical fibers; a plurality of stranded loose tubes including one or more optical fibers and a single central tube including individual fibers or optical fiber ribbons.

18. The optical fiber cable of claim 1 wherein said water-blocking compound may be oil or gel based or based on a dry, superabsorbent polymer.

19. The optical fiber cable of claim 1 wherein said detectable element is terminable at said premise end.

20. The optical fiber cable of claim 1 wherein said detectable element is terminable at both said distribution enclosure end and said premise end.

21. An optical fiber cable having an easily removable locating element, which includes:
   (a) a core including a plurality of optical fibers;
   (b) a tubular member comprising a buffer tube in which said optical fibers are disposed;
   (c) a jacket system formed from flame retardant polyvinyl chloride (PVC) which is disposed about said tubular member,
   (d) a longitudinally extending detectable wire which does not function as a communications cable and which is detachably connected to said tubular member by said jacket system which is disposed about said wire so as to define a web between said tubular member and said detectable wire;
   (e) wherein said web defines a notch between said tubular member and said detectable wire which serves as a shear plane to facilitate the propagation of a tear between said tubular member and said detectable wire, said web having a thickness of about 2.0 mm or less; and (f) wherein said optical fiber cable comprises a water-blocking compound in said tubular member and between said tubular member and said jacket system.

22. The optical fiber cable of claim 21 wherein said wire is a 24 AWG copper wire.

23. The optical fiber cable of claim 21 wherein said web has a thickness of less than 0.5 mm.

24. The optical fiber cable of claim 21 wherein said web has a thickness of 0.44 mm.

25. The optical fiber cable of claim 21 wherein a notch is both defined on the top and bottom of said web and each notch defines a radius.

26. The optical fiber cable of claim 21 wherein said radius is less than 1.0 mm and preferably less than 0.20 mm.

27. The optical fiber cable of claim 21 wherein said optical fiber cable includes one or more dielectric longitudinally extending strength members adjacent said tubular member.

28. The optical fiber cable of claim 27 wherein said optical fiber cable includes two dielectric fiber reinforced plastic (FRP) strength members.

29. The optical fiber cable of claim 21 wherein said tubular member is made of plastic material.

30. The optical fiber cable of claim 21 wherein said water-blocking compound may be oil or gel based or based on a dry, superabsorbent polymer.

31. The optical fiber cable of claim 21 wherein said detectable element is terminable at said premise end.

32. The optical fiber cable of claim 21 wherein said detectable element is terminable at both said distribution enclosure end and said premise end.

* * * * *